May 23, 1933.  J. H. HUNT ET AL  1,910,250
WIRE WHEEL HUB SHELL ASSEMBLY
Filed July 2, 1930  2 Sheets-Sheet 1
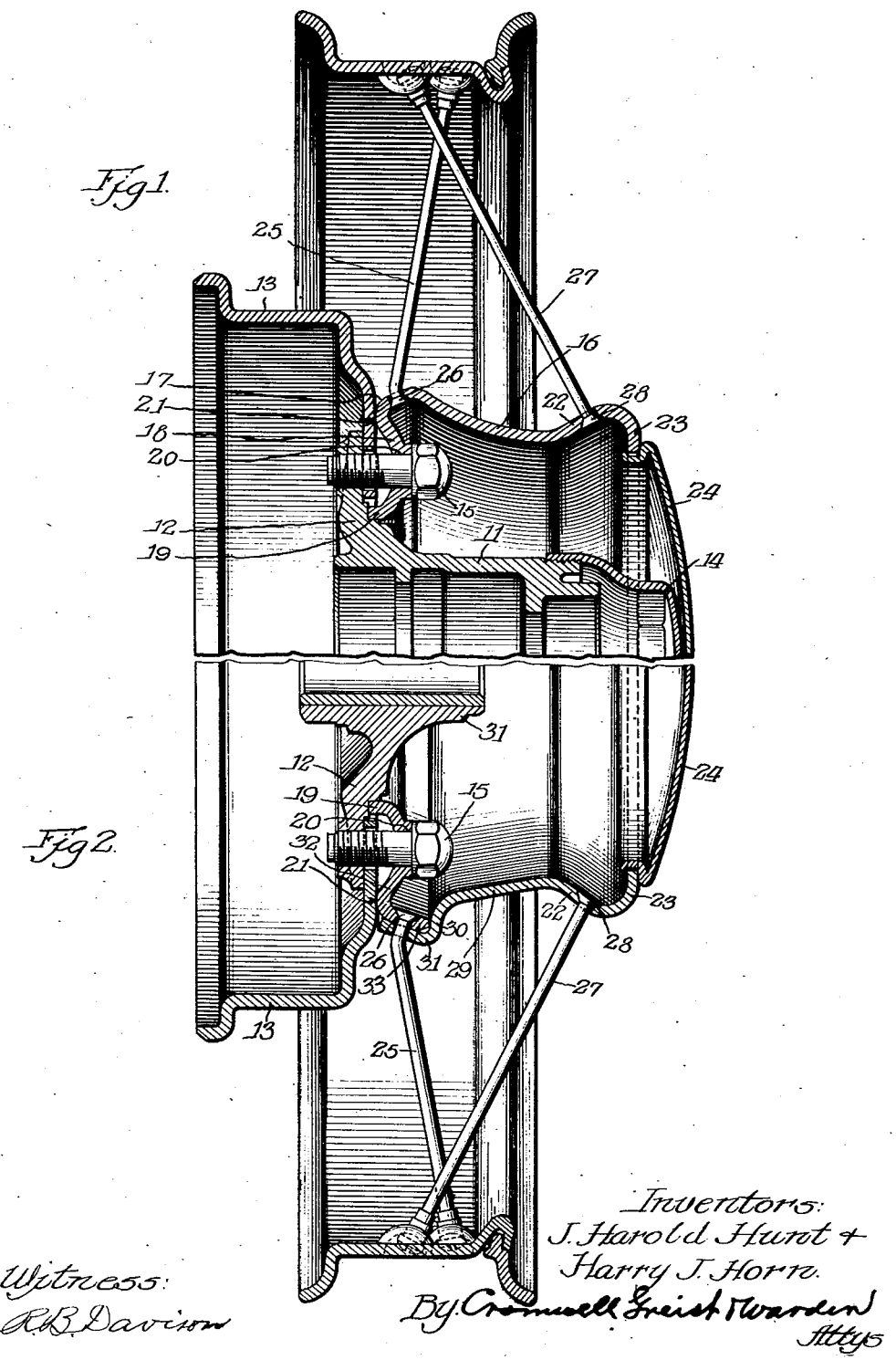
Inventors:
J. Harold Hunt +
Harry J. Horn.

May 23, 1933.  J. H. HUNT ET AL  1,910,250
WIRE WHEEL HUB SHELL ASSEMBLY
Filed July 2, 1930  2 Sheets-Sheet 2
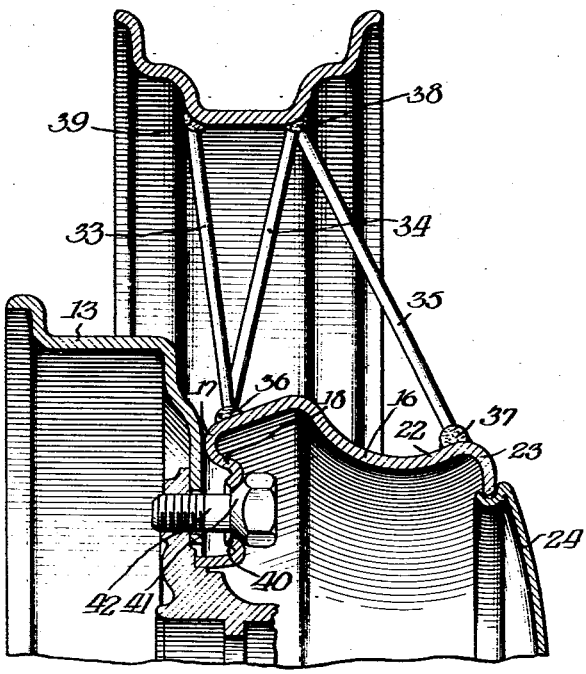
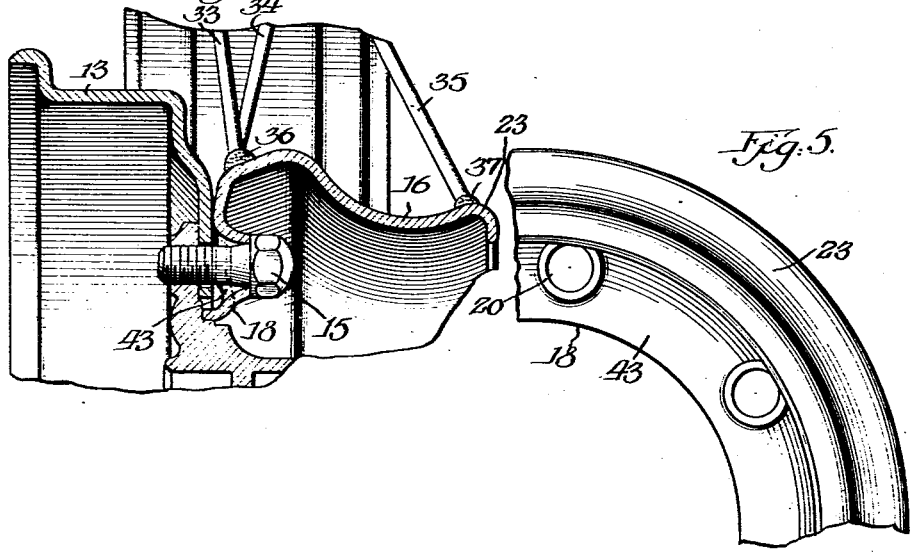
Witness:
R. B. Davison
Inventors:
J. Harold Hunt +
Harry J. Horn.
By Cromwell, Greist & Warden
Attys Patented May 23, 1933

1,910,250

UNITED STATES PATENT OFFICE

J. HAROLD HUNT AND HARRY J. HORN, OF LANSING, MICHIGAN, ASSIGNORS TO MOTOR WHEEL CORPORATION, OF LANSING, MICHIGAN, A CORPORATION OF MICHIGAN

WIRE WHEEL HUB SHELL ASSEMBLY

Application filed July 2, 1930. Serial No. 465,330.

This invention pertains to the assembly and mounting of wire wheels in the hub zone, and more particularly to the construction of the hub shell, whereby to attain improved efficiency and appearance, a secure spoke anchorage, a saving of material and labor, greater facility for lacing or otherwise securing the spokes in place, accessibility to the hub-attaching bolts, ease of mounting on the vehicle hub proper adapted for other types of wheels, and a saving of weight. Heretofore the conventional method has been to make the hub shell with an overlapping of metals and large diameters of the attaching flange. The present method does away with this waste of metal, weight and labor.

For the purpose of facilitating a ready understanding of the invention preferred and modified embodiments of the same are set forth in the accompanying illustrative drawings wherein Fig. 1 represents in radial section an assembly with a front wheel showing the hub shell barrel and flange in one piece and nipple spokes; Fig. 2 a similar view of an assembly with a rear wheel showing a modified form of the hub shell barrel and flange in two pieces; and Figs. 3, 4 and 5 assemblies with welded spokes and modified forms of clamping devices.

Describing the structural features of the invention by reference to the appended drawings, the permanent hub of Fig. 1 comprises the barrel 11 and its radial flange 12 to the front face of which a brake drum 13 is shown as secured. Upon the front end of the hub barrel is secured the grease retaining cap 14. The construction thus far referred to forms of itself no part of the present invention.

To the hub flange 12 is secured by means of the lug bolts, studs or other equivalent attaching elements 15 the hub shell body of generally cylindrical shape, the barrel 16 of which is shown as flared outwardly and rearwardly and then return bent inwardly and towards the rear to form a rearwardly converging portion 17, and again radially inward along a forwardly convex arcuate line to provide an inner flange 18 partially closing the rear end of the shell. Said flange has an easy fit at its inner edge 19 upon a radially facing shoulder of the hub barrel 11. That portion of the flange 18 apertured at 20 for the reception of the bolts 15 is arcuate in contour, whereby a tightening of the bolts will tend to spread the arch thereby to secure a tight fit upon said shoulder. It will be observed that the flange 18 at its junction with the bend 17 has a rear bearing upon the brake drum at 21, and such converging portion 17 is disposed at an oblique angle, here shown as approximately 30° to the axis of the wheel and shell.

Adjacent its forward end the shell is outwardly and then inwardly shaped to provide a rearwardly converging portion 22 and an inturned marginal portion 23. The forward end of the barrel is open, said opening including the axes of the hub-attaching bolts 15 whereby to afford ready access to said bolts when the cover plate 24 is removed from the opening, wherein it is sprung or otherwise removably disposed to protect the interior of the shell from entrance of dirt and the like and also to conceal the bolts and hub from external view.

The converging portion 17 adjacent the rear end of the shell is apertured to receive the rear series of spokes 25 and countersunk to form an anchorage for the spoke heads 26. It will be observed that the combination of the portion 17 disposed at an oblique angle to the axis of the wheel and the reverse angle of the rear series of spokes, greatly facilitates the lacing of the spokes into place. The converging portion 22 adjacent the front end of the shell is likewise apertured to receive the forward series of spokes 27 and countersunk to form an anchorage for the spoke heads 28.

The foregoing description also applies in every particular to the assemblage illustrated in Fig. 2, save as to the barrel portion of the hub proper, here represented by the reference numeral 29, and the flanged portion of the hub shell. The hub shell barrel is rearwardly shaped outwardly and then inwardly to provide a diverging portion 30 and a converging portion 31 corresponding to the portion 17 of Fig. 1, which is disposed at an oblique angle to the axis of the wheel. Rigidly affixed to the inside of the marginal portion 31, and corresponding to the inwardly projecting flange 18 of Fig. 1, is an annular flange member 32, the outer marginal portion 33 of which is disposed at an oblique angle to the axis of the wheel parallel to the marginal portion 31, within which it is rigidly fixed. The flange 32 in cross section is curved along arcuate lines to correspond with the flange 18 of Fig. 1 to form the bearing 21, the seat 19 and the apertures 20 for the bolts 15.

The portion 33 is apertured to receive the rear series of spokes 25 and countersunk to form an anchorage for the spoke heads 26. The marginal portion 31 is likewise apertured to permit a loose reception therein of the spokes 25. It will be observed that as between Figs. 2 and 1, the difference lies in providing the hub shell at the rear end with two plies of metal instead of one, as an anchorage for the rear series of spokes.

Referring to Figs. 3, 4 and 5 of the drawings, instead of spoke series 25 and 27 having inner heads seated in apertures formed in the hub shell and their outer ends secured in apertures of the rim by screw nipples, spoke series 33, 34 and 35 are secured to the hub shell by welding as at 36 and 37 and to the rim by welding as at 38 and 39, thus avoiding the aperturing of the hub shell and rim.

In Fig. 3 the inner flange 18 while of forwardly convex section at the bolt apertures as in Figs. 1 and 2 is medially recessed at 40 to form an expansible seat for the coned heads 41 of the securing bolts 42.

As illustrated in Figs. 4 and 5 the convexity of the securing flange 18 is not continuous throughout the circle formed by the bolt apertures but the convexity is limited to that part of the flange immediately surrounding each aperture, the intermediate portion of the flange indicated at 43 being substantially flat.

We claim:

1. The combination with a wheel hub having a fixed flange with a shouldered front face, of a one-piece hub shell for demountable wire wheels comprising a generally cylindrical barrel portion open at its front end and having its rear end partially closed by an inwardly extending flange terminating in a rearwardly turned edge adapted to seat on the hub flange shoulder, said flange apertured to receive hub-attaching bolts.

2. The combination with a wheel hub having a fixed flange with a shouldered front face, of a one-piece hub shell for demountable wire wheels comprising a generally cylindrical barrel portion open at its front end and having its rear end partially closed by an inwardly extending flange of forwardly convex arcuate cross-section terminating in a rearwardly turned edge adapted to seat on the hub flange shoulder, said flange apertured to receive hub-attaching bolts.

3. A hub shell for demountable wire wheels comprising a generally cylindrical barrel portion open at its front end and having its rear end partially closed by an inwardly extending flange terminating in a rearwardly turned edge, said flange apertured to receive hub-attaching bolts, the shell adjacent its open front end and also adjacent its flanged rear end having rearwardly converging portions inclined to the shell axis and apertured to receive and form anchorages for the headed inner ends of front and rear series of spokes.

4. A hub shell for demountable wire wheels comprisng a generally cylindrical barrel portion open at its front end and having its rear end partially closed by an inwardly extending flange of forwardly convex arcuate cross-section terminating in a rearwardly turned edge, said flange apertured to receive hub-attaching bolts, the shell adjacent its open front end and also adjacent its flanged rear end having rearwardly converging portions inclined at an oblique angle to the shell axis and apertured to receive and form anchorages for the headed inner ends of front and rear series of spokes.

5. A hub assembly for demountable wire wheels comprising a hub proper having a radial hub flange, a hub shell enveloping the hub proper and comprising a generally cylindrical barrel portion open at its front end and having its rear end partially closed by an inwardly extending flange terminating in a rearwardly turned edge, said flange apertured to receive hub-attaching bolts, the shell adjacent its open front end and also adjacent its flanged rear end having rearwardly converging portions inclined to the shell axis and apertured to receive and form anchorages for the headed inner ends of front and rear series of spokes.

6. A hub assembly for demountable wire wheels comprising a hub proper having a radial hub flange with a shouldered front face, a hub shell enveloping the hub proper and comprising a generally cylindrical barrel portion open at its front end and having its rear end partially closed by an inwardly extending flange of forwardly convex arcuate cross-section presenting an inner radial shoulder-bearing edge, said flange apertured to receive hub-attaching bolts, the shell adjacent its open front end and also adjacent its flanged rear end having rearwardly converging portions inclined at an angle of substantially 30° to the shell axis and apertured to receive and form anchorages for the headed inner ends of front and rear series of spokes.

7. The combination with a wheel hub having a fixed flange with a shouldered front face, of a one-piece hub shell for demountable wire wheels comprising a generally cylindrical barrel portion open at its front end and having its rear end partially closed by an inwardly extending flange terminating in a rearwardly turned edge adapted to seat on the hub flange shoulder, said flange apertured to receive hub-attaching bolts and of forwardly convex section at the apertures.

8. A one-piece hub shell for demountable wire wheels comprising a generally cylindrical barrel portion open at its front end and having its rear end partially closed by an inwardly extending flange terminating in a rearwardly turned edge, said flange apertured to receive hub-attaching bolts, the barrel portion of the shell shaped to provide anchorage for front and rear series of spokes.

9. A one-piece hub shell for demountable wire wheels comprising a generally cylindrical barrel portion open at its front end and having its rear end partially closed by an inwardly extending flange of forwardly convex arcuate cross-section terminating in a rearwardly turned edge, said flange apertured to receive hub-attaching bolts, the barrel portion of the shell shaped to provide anchorage for front and rear series of spokes.

10. A hub shell for demountable wire wheels comprising a generally cylindrical barrel portion open at its front end and having its rear end partially closed by an inwardly extending flange terminating in a rearwardly turned edge, said flange apertured to receive hub-attaching bolts, the shell adjacent its open front end and also adjacent its flanged rear end inclined to the shell axis and adapted to provide anchorage for front and rear series of spokes.

11. A hub assembly for demountable wire wheels comprising a hub proper having a radial hub flange, a hub shell enveloping the hub proper and comprising a generally cylindrical barrel portion open at its front end and having its rear end partially closed by an inwardly extending flange terminating in a rearwardly turned edge, said flange apertured to receive hub-attaching bolts and of forwardly convex section at the apertures, the shell adjacent its open front end and also adjacent its flanged rear end having portions inclined to the shell axis and adapted to provide anchorage for front and rear series of spokes.

12. The combination with a wheel hub having a fixed flange with a shouldered front face, of a one-piece hub shell for demountable wire wheels comprising a generally cylindrical barrel portion open at its front end and having its rear end partially closed by an inwardly extending flange terminating in a rearwardly turned edge adapted to seat on the hub flange shoulder, said flange apertured to receive hub-attaching bolts and of forwardly convex medially recessed section at the apertures.

13. The combination with a wheel hub having a fixed flange with a shouldered front face, of a one-piece hub shell for demountable wire wheels comprising a generally cylindrical barrel portion open at its front end and having its rear end partially closed by an inwardly extending flange of forwardly convex arcuate cross-section terminating in a rearwardly turned edge adapted to seat on the hub flange shoulder, said flange apertured to receive hub-attaching bolts having coned faces and recessed about the apertures to accommodate the coned faces of the bolts.

In testimony whereof we have hereunto subscribed our names.

J. HAROLD HUNT.
HARRY J. HORN.